United States Patent [19]
Nolte et al.

[11] Patent Number: 5,837,342
[45] Date of Patent: Nov. 17, 1998

[54] PROCESS FOR APPLYING ANTIDRIP EDGE TO A GLASS SHEET

[75] Inventors: Hans-Henning Nolte; Helga Grünzel, both of Gelsenkirchen; Bernhard Sattler, Dortmund, all of Germany

[73] Assignee: Flachglas AG, Furth, Germany

[21] Appl. No.: 540,399

[22] Filed: Oct. 6, 1995

[30] Foreign Application Priority Data

Oct. 7, 1997 [DE] Germany .......................... 44 35 843.1

[51] Int. Cl.⁶ .................................................... B32B 3/02
[52] U.S. Cl. ............................ 428/45; 427/284; 427/270; 156/71; 156/196
[58] Field of Search ...................................... 427/284, 270, 427/294, 444; 428/45, 428, 921; 156/71, 152, 160, 196

*Primary Examiner*—Merrick Dixon
*Attorney, Agent, or Firm*—Herbert Dubno; Yuri Kateshov

[57] ABSTRACT

An antidrip edge composition of fine-powder glass formers, cellulosic polymer and water to which a mineral acid is added has a pot-life lengthener for the dispersion is subjected to vacuum and/or agitation and/or vibration to remove bubbles, upon application to a glass sheet, prevents escape of an alkali silicate solution forming a fire-resisting intervening layer between that glass sheet and another glass or plastic sheet applied thereto.

15 Claims, 1 Drawing Sheet

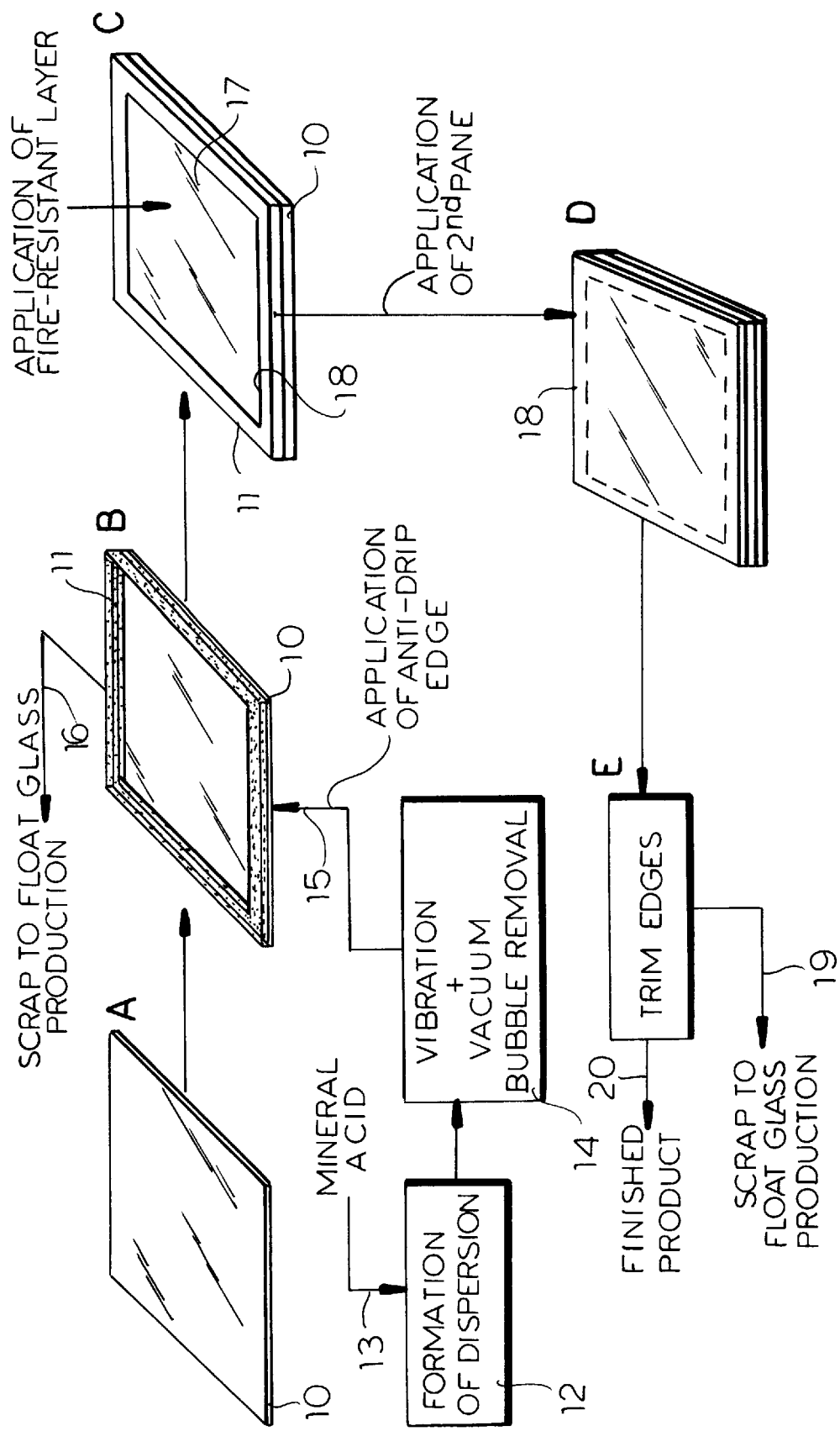

PROCESS FOR APPLYING ANTIDRIP EDGE TO A GLASS SHEET

FIELD OF THE INVENTION

Our present invention relates to a process for applying an antidrip edge to a glass sheet and, more particularly, to the production of fire-resistant glazing panels consisting of two or more panes with intervening fire-resistant layers, at least one of the panes being a glass sheet.

BACKGROUND OF THE INVENTION

In the production of fire-resistant glazing panels, it is known to provide a frame around the edge of a glass sheet or pane and to dispose inwardly of that frame aqueous alkali silicate solution which, upon drying, can form an intervening layer to which another glass pane or a plastic sheet is applied to form a sandwich structure.

The "frame" may be an antidrip edge which is applied on the first glass pane to act as a barrier within which the aqueous alkali silicate solution is confined.

The water of the solution is removed at an elevated temperature and the alkali silicate layer can thus solidify to produce a material which, in the case of fire, tends to foam and thereby acts as a fire-retardant material between the two panes or sheets.

Of course additional glass or plastic sheets with additional intervening fire-retardant layers can be applied if desired.

DE 19 00 054 B2 describes fire-retardant glazing panels of this type.

While preformed systems have been placed on a glass sheet to confine the aqueous alkali silicate solution in early production methods, more recently the antidrip edge has been formed by a bonding cement which is applied to the glass sheet.

Where the edging with the bonding cement must be trimmed from the glazing unit or scrap containing the bonding cement develops elsewhere in the process, this earlier system suffers from the drawback that the scrap cannot be used in the production process and must be removed therefrom.

The bonding cement in the past has consisted mainly of kaolin and sodium water glass (sodium silicate) and additionally includes water. The difficulty with this bonding cement is that already described, namely, the edge sections of the glazing must be scrapped and recycling of them is not possible because the edge scrap contains impurities which interfere with the glass manufacturing process.

Another drawback is that a mixture of kaolin, water glass and water can form a simple composition which is readily made but that composition contains bubbles which may result in pores in the antidrip edge during heat treatment and through which the aqueous alkali silicate solution can escape. The result can be a defective intervening layer between the panes, losses of material, defective glazing panels, etc.

OBJECTS OF THE INVENTION

It is, therefore, the principal object of the present invention to provide an improved method of making a fire-resistant glazing panel in which leakage from the antidrip edge is precluded and the resulting products are of higher quality than has been possible heretofore while losses are limited.

Still another object of the invention is to provide a process for producing fire-retardant glazing units, the edge sections of which can be recycled to a glass melt.

SUMMARY OF THE INVENTION

These objects are achieved, in accordance with the invention in a process for applying an antidrip edge to a glass sheet in the course of producing fire-resistant glazing units, which comprises the steps of:

(A) combining a fine-particle glass forming filler and a cellulosic polymer with water to form a bonding cement as a dispersion;

(B) adding a mineral acid as a pot-life regulator to said dispersion to impart a pot life thereto of 10 to 20 minutes;

(C) freeing the dispersion from bubbles after the addition of the mineral acid thereto and permitting the dispersion freed from bubbles to mature and form an edge-forming material; and (D) applying the edge-forming material during the pot life to an edge portion of a glass sheet adapted to form part of a fire-resistant glass panel.

In accordance with the invention, therefore, the bonding cement is prepared from a fine-particle glass former as a filler and of a cellulosic polymer which, together with water, form a dispersion. A mineral acid or a mixture of mineral acids can then be added to that dispersion as a pot-life regulator in a quantity such that the pot life of the dispersion is 10 to 20 minutes.

The dispersion provided with the pot-life regulator is freed from bubbles within the pot-life period by the action of vacuum and/or vibration and/or agitation and the dispersion, freed from these air bubbles can be permitted to mature to form the bonding cement which is applied as an antidrip edge on the edge of a glass sheet.

In the case of the invention, kaolin and water glass are not essential as binders in the adhesive if a cellulosic polymer is provided as a binder. The use of the cellulosic polymer allows a glass former to be employed as a filler. The term "glass former" or "glass-forming filler" is here used to denote fine-particle glass as well as any of the components used in a batch for making such glass such as calcium silicate, alkali silicates which solidify amorphously, calcium carbonate and silica sand.

A premix of such fillers and a cellulosic polymer alone without other additives tends to have a viscosity which increases at an undesirable rate when prepared with water and hence to a pot life within which this mixture is sufficiently liquid to be handled, is too short.

A relatively small amount of a mineral acid added as a pot-life regulator, however, can readily yield a pot life of 10 to 20 minutes, providing sufficient time to enable the application of vacuum, vibration or agitation or any combination of them to remove air bubbles which tend to form in the cement.

Surprisingly, an antidrip edge of this composition can be introduced into a float glass melt or batch without any drawbacks.

According to a feature of the invention, the glass-forming filler can be selected from the group which consists of glass beads, powdered glass, calcium carbonate, magnesium carbonate, calcium phosphate, calcium sulfate, fine sand and mixtures thereof.

The mineral acids can be selected from the group which consists of phosphoric acid, especially orthophosphoric acid, sulfur acid and mixtures thereof.

We have found, moreover, that an acid-containing antidrip edge has an advantage that the acid is incompatible with the water glass of the fire-resistant layer and when that solution is applied, at the interface between the antidrip edge and the aqueous water glass solution, a dense gel is formed which prevents attack on the antidrip edge and pore formation or additional bubbles, higher product quality with shorter drying times can thus result.

The fine-particle glass-forming filler should preferably be a glass powder or calcium carbonate and in all cases fine-grained silica sand can be present as the part of the fine-particle glass-forming filler.

The preferred cellulosic polymer is high polymer methylhydroxyethyl cellulose. The phosphoric acid should preferably be the mineral acid and as a rule the mineral acid should be employed in an amount less than 2%, preferably in an amount of at most 1.5% although an amount less than 1%, all by weight, can suffice. The low limit of the mineral acid is usually 0.1% by weight but the preferred lower limit is 0.4% by weight.

In another aspect of the invention a method of making float glass from a float glass melt can comprise the steps of:

(A) combining a fine-particle glass forming filler and a cellulosic polymer with water to form a bonding cement as a dispersion;

(B) adding a mineral acid as a pot-life regulator to said dispersion to impart a pot life thereto of 10 to 20 minutes;

(C) freeing the dispersion from bubbles after the addition of the mineral acid thereto and permitting the dispersion freed from bubbles to mature and form an edge-forming material;

(D) applying the edge-forming material during the pot life to an edge portion of a glass sheet adapted to form part of a fire-resistant glass panel; and (E) trimming edge sections provided with the antidrip edge in finishing the panels and adding the edge sections to the melt.

A method of making a fire-resistant glazing panel can comprise the steps of:

(A) combining a fine-particle glass forming filler and a cellulosic polymer with water to form a bonding cement as a dispersion;

(B) adding a mineral acid as a pot-life regulator to said dispersion to impart a pot life thereto of 10 to 20 minutes;

(C) freeing the dispersion from bubbles after the addition of the mineral acid thereto and permitting the dispersion freed from bubbles to mature and form an edge-forming material;

(D) applying the edge-forming material during the pot life to a frame-shaped edge portion of a glass sheet adapted to form part of a fire-resistant glass panel;

(D) depositing on the glass sheet a fire-resistant intervening layer within the frame-shaped edge portion; and (F) bonding another pane of glass or synthetic resin onto the intervening layer and edge portion to form the fire-resistant glass panel.

BRIEF DESCRIPTION OF THE DRAWING

The above and other objects, features, and advantages description, reference being made to the sole FIGURE of which is a flow diagram illustrating the invention.

SPECIFIC DESCRIPTION AND EXAMPLE

In the drawing, we have shown a sheet or pane 10 of float glass which is disposed horizontally and to which an antidrip edge 11 is applied, e.g. by screen printing or painting during the pot life of an adhesive or cement which is produced as a dispersion at 12 by combining the glass-forming filler with water and a cellulosic polymer. Following the formation of the dispersion by agitation these components together, the mineral acid is added as represented at 13 and the mixture is subjected to vibration and vacuum for possible removal at 14 during the pot life of the composition. The antidrip edge is applied, s represented at 15, to the glass sheet. The glass sheet carrying the antidrip edge, if defective, may be fed at 16 as scrap to the float glass production stages.

When the antidrip edge is dry, within the confines defined by the antidrip edge 11, a fire-resistant layer 17 is applied in a subsequent stage, in the form of an aqueous alkali silicate solution. At the interface 18 between that solution and the antidrip edge, the dense gel previously described is formed. The glass substrate 10 has been represented both in stage B and in stage C of the process.

In stage D of the process, a second pane or sheet 18 is applied, following the drawing of the alkali silicate solution and bonded to that layer with heat and pressure. The second pane, while usually glass, can be a plastic like a polycarbonate when, for example, the substrate 10 is to be turned to the fire side of a structure in which the panel is used as a fire barrier. In a subsequent stage E, the edges can be trimmed from this panel and the edge portion fed as scrap at 19 to the float glass production process leaving the finished panel at 20.

By way of example, 50 liters of demineralized water are mixed with one kilogram of 85% orthophosphoric acid with stirring and to this mixture, while stirring is continued, 50 kilograms of glass powder are added. The stirring tends to eliminate most of the adherent air and thus any incipient bubble formation. 2.4 kilograms of methylhydroxyethyl cellulose are then stirred into the mixture and stirring is continued under vacuum. The mixing process was complete after about 10 minutes and the resulting mass was homogeneous with a pot life of 10 to 20 minutes. It was applied to glass sheets as an antidrip barrier around the edges of the sheet. The low viscosity and the reduced rate of development of the viscosity of the mixture were found to contribute to the ability to remove bubbles therefrom by contrast with prior art antidrip cements.

The antidrip cement edging or dried under heating and within the antidrip barrier an aqueous alkali silicate solution was deposited. The antidrip edging was found to be free from scouring by the alkali silicate by reason of gel-formation at the interface. After drying of the alkali silicate solution to form the fire-resistant intervening layer, the second sheet, here also of glass, was applied and bonded to the intervening layer of the first sheet. The edges were trimmed and recycled to the float glass batch. The fire-resistant panel was highly effective as a fire barrier in structures.

We claim:

1. A process for applying an antidrip edge to a glass sheet, comprising the steps of:

(a) forming a bonding cement as a dispersion by combining a fine-particle glass forming filler and a cellulosic polymer with water;

(b) controlling a pot life of said cement by adding a mineral acid as a pot-life regulator, thereby prolonging a pot life of said dispersion to 10 to 20 minutes;

(c) freeing said dispersion from bubbles after the addition of said mineral acid thereto and permitting the dispersion freed from bubbles to mature and form an edge-forming material; and (d) applying said edge-forming material during said pot life to an edge portion of a glass sheet, thereby forming part of a fire-resistant glass panel.

2. The process defined in claim 1 wherein said dispersion is freed from bubbles in step (C) by subjecting the dispersion to which the mineral acid has been added to the action of vacuum.

3. The process defined in claim 1 wherein said dispersion is freed from bubbles in step (C) by subjecting the dispersion to which the mineral acid has been added to the action of vibration.

4. The process defined in claim 1 wherein said dispersion is freed from bubbles in step (C) by subjecting the dispersion to which the mineral acid has been added to agitation.

5. The process defined in claim 1 wherein said dispersion is freed from bubbles in step (C) by subjecting the dispersion to which the mineral acid has been added to the action of vacuum and agitation.

6. The process defined in claim 1 wherein said dispersion is freed from bubbles in step (C) by subjecting the dispersion to which the mineral acid has been added to the action of vacuum and vibration.

7. The process defined in claim 1 wherein said fine-particle glass forming filler is constituted by at least one substance for producing float glass.

8. The process defined in claim 2 wherein said fine-particle glass forming filler is glass powder.

9. The process defined in claim 1 wherein said fine-particle glass forming filler is constituted at least in part by calcium carbonate.

10. The process defined in claim 1 wherein said fine-particle glass forming filler is constituted at least in part by fine particle silica sand.

11. The process defined in claim 1 wherein said cellulosic polymer is high molecular weight methylhydroxyethyl cellulose polymer.

12. The process defined in claim 1 wherein said mineral acid is phosphoric acid.

13. The process defined in claim 12 wherein said mineral acid is added to said dispersion in an amount of less than 1 percent by weight.

14. The process defined in claim 1 wherein the dispersion after the addition of mineral acid and freed from bubbles contains 2.5 to 3 weight percent of the cellulosic polymer, 50 to 57 weight percent of said glass forming filler and 0.4 to 1.5 weight percent orthophosphoric acid.

15. In a method of making float glass from a float glass melt, the improvement wherein:

an antidrip edge is applied to a glass sheet by the steps of:
(a) form a bonding cement as a dispersion by combining a fine-particle glass forming filler and a cellulosic polymer with water;
(b) controlling a pot life of said dispersion by adding a mineral acid as a pot-life regulator to said dispersion, thereby prolonging a pot life thereof to 10 to 20 minutes;
(c) freeing said dispersion from bubbles after the addition of said mineral acid thereto and permitting the dispersion freed from bubbles to mature and form an edge-forming material; and
(d) applying said edge-forming material during said pot life to an edge portion of a glass sheet forming part of a fire-resistant glass panel, the improvement wherein edge sections provided with said antidrip edge and obtained from finishing said panels are added to said melt.

* * * * *